United States Patent
Kongo

(10) Patent No.: US 10,995,437 B2
(45) Date of Patent: May 4, 2021

(54) COORDINATE DATA GENERATOR, SEWING MACHINE, AND NON-TRANSITORY RECORDING MEDIUM

(71) Applicant: JANOME SEWING MACHINE CO., LTD., Tokyo (JP)

(72) Inventor: Takeshi Kongo, Tokyo (JP)

(73) Assignee: JANOME SEWING MACHINE CO., LTD., Tokyo (JP)

(*) Notice: Subject to any disclaimer, the term of this patent is extended or adjusted under 35 U.S.C. 154(b) by 126 days.

(21) Appl. No.: 16/414,493

(22) Filed: May 16, 2019

(65) Prior Publication Data

US 2020/0010990 A1 Jan. 9, 2020

(30) Foreign Application Priority Data

Jul. 5, 2018 (JP) .............................. JP2018-128399

(51) Int. Cl.
*D05B 19/10* (2006.01)
*D05B 19/08* (2006.01)
*G06F 3/14* (2006.01)

(52) U.S. Cl.
CPC ............. *D05B 19/10* (2013.01); *D05B 19/08* (2013.01); *G06F 3/14* (2013.01)

(58) Field of Classification Search
CPC ............ D05B 19/00; D05B 19/16; G06F 3/14
See application file for complete search history.

(56) References Cited

U.S. PATENT DOCUMENTS

| | | | | |
|---|---|---|---|---|
| 4,200,049 A | * | 4/1980 | Blessing | D05B 27/12 112/475.05 |
| 4,823,714 A | * | 4/1989 | Yokoe | D05B 19/08 112/103 |
| 6,161,491 A | * | 12/2000 | Takenoya | D05B 19/02 112/102.5 |
| 6,587,745 B1 | * | 7/2003 | Polden | D05B 19/08 700/138 |
| 2007/0198119 A1 | * | 8/2007 | Bailie | D05B 19/08 700/138 |
| 2012/0073484 A1 | * | 3/2012 | Nakamura | D05B 19/12 112/154 |
| 2013/0190916 A1 | * | 7/2013 | Schnaufer | D05B 19/12 700/137 |
| 2016/0069007 A1 | * | 3/2016 | Kongo | D05B 19/06 700/138 |

FOREIGN PATENT DOCUMENTS

| | | |
|---|---|---|
| CN | 1807737 A | 7/2006 |
| CN | 105568567 B | 5/2018 |
| JP | 2852967 B2 | 2/1999 |
| JP | 2011-245092 A | 12/2011 |

* cited by examiner

*Primary Examiner* — Ismael Izaguirre
(74) *Attorney, Agent, or Firm* — Nakanishi IP Associates, LLC

(57) ABSTRACT

A coordinate data generator includes a coordinate data storage to store coordinate data, and a post-addition coordinate data generation section to respectively add independent values to the X coordinate value or the Y coordinate value of the coordinate data for each item of the coordinate data stored in the coordinate data storage, so as to generate new coordinate data in which a pattern has been distorted.

9 Claims, 13 Drawing Sheets

A; COMBINATION
B; HAND-DRAWN-EFFECT
C; DELETE
D; SAVE

FIG.5

| STITCH NUMBER | ORIGINAL DATA | | | RANDOM NUMBER ADJUSTMENT LENGTHS | | HAND-DRAWN PROCESSING | | |
|---|---|---|---|---|---|---|---|---|
| | AMPLITUDE | RELATIVE FEED | ABSOLUTE FEED | FOR AMPLITUDE | FOR FEED | AMPLITUDE | ABSOLUTE FEED | RELATIVE FEED |
| 1 | 4.4 | 2.3 | 0.0 | 0.2 | 0.0 | 4.4 | 0.0 | 2.5 |
| 2 | 4.4 | 2.4 | 2.3 | 0.6 | 0.2 | 4.4 | 2.5 | 2.2 |
| 3 | 4.4 | 2.3 | 4.7 | 0.1 | 0.0 | 4.4 | 4.7 | 2.3 |
| 4 | 4.4 | 0.0 | 7.0 | −0.2 | 0.0 | 4.2 | 7.0 | 0.2 |
| 5 | 0.8 | 0.0 | 7.0 | −0.2 | 0.2 | 0.6 | 7.2 | −0.5 |
| 6 | −2.4 | −1.7 | 7.0 | 0.2 | −0.3 | −2.2 | 6.7 | −1.4 |
| 7 | −2.4 | −1.8 | 5.3 | 0.0 | 0.0 | −2.4 | 5.3 | −2.1 |
| 8 | −2.4 | 0.0 | 3.5 | −0.2 | −0.3 | −2.6 | 3.2 | 0.3 |
| 9 | 0.0 | 1.7 | 3.5 | −0.6 | 0.0 | −0.6 | 3.5 | 1.3 |
| 10 | 0.0 | 0.0 | 5.2 | 0.2 | −0.4 | 0.2 | 4.8 | 0.0 |
| 11 | 2.4 | −3.2 | 5.2 | 0.6 | −0.4 | 3.0 | 4.8 | −3.0 |
| 12 | 2.4 | 0.0 | 2.0 | 0.2 | −0.2 | 2.6 | 1.8 | 0.2 |
| 13 | −1.2 | 0.0 | 2.0 | −0.4 | 0.0 | −1.6 | 2.0 | −0.2 |
| 14 | −4.4 | 2.5 | 2.0 | 0.0 | −0.2 | −4.4 | 1.8 | 2.5 |
| 15 | −4.4 | 2.3 | 4.5 | 0.8 | −0.2 | −3.6 | 4.3 | 2.7 |
| 16 | −4.4 | 2.4 | 6.8 | 0.4 | 0.2 | −4.0 | 7.0 | 2.3 |
| 17 | −4.4 | 0.0 | 9.2 | −0.1 | 0.1 | −4.4 | 9.3 | −0.1 |
| 18 | 0.0 | 0.0 | 9.2 | −0.8 | 0.0 | −0.8 | 9.2 | −0.2 |
| 19 | 4.4 | 0.0 | 9.2 | 0.5 | −0.2 | 4.4 | 9.0 | 0.0 |

FIG.8

| STITCH NUMBER | ORIGINAL DATA | | | RANDOM NUMBER ADJUSTMENT LENGTHS | | HAND-DRAWN PROCESSING | | |
|---|---|---|---|---|---|---|---|---|
| | AMPLITUDE | RELATIVE FEED | ABSOLUTE FEED | FOR AMPLITUDE | FOR FEED | AMPLITUDE | ABSOLUTE FEED | RELATIVE FEED |
| 1 | -1.6 | 3.2 | 0.0 | 0.0 | 0.0 | -1.6 | 0.0 | 3.3 |
| 2 | -1.6 | 3.1 | 3.2 | 0.0 | 0.1 | -1.6 | 3.3 | 3.0 |
| 3 | -1.6 | 3.4 | 6.3 | -0.4 | 0.0 | -2.0 | 6.3 | 3.2 |
| 4 | -1.6 | -2.4 | 9.7 | -0.2 | -0.2 | -1.8 | 9.5 | -2.5 |
| 5 | 0.2 | -2.8 | 7.3 | -0.4 | -0.3 | -0.2 | 7.0 | -2.5 |
| 6 | 2.4 | -3.0 | 4.5 | 0.2 | 0.0 | 2.2 | 4.5 | -3.2 |
| 7 | 4.4 | 3.5 | 1.5 | 0.4 | -0.2 | 4.4 | 1.3 | 3.5 |
| 8 | -4.4 | 3.7 | 5.0 | -0.1 | -0.2 | -4.4 | 4.8 | 3.7 |
| 9 | 4.4 | -3.0 | 8.7 | 0.5 | -0.2 | 4.4 | 8.5 | -2.8 |
| 10 | 2.4 | -3.2 | 5.7 | 0.2 | 0.0 | 2.6 | 5.7 | -3.4 |
| 11 | 0.2 | -2.5 | 2.5 | 0.8 | -0.2 | 1.0 | 2.3 | -2.3 |
| 12(1) | -1.6 | 3.2 | 0.0 | 0.0 | 0.0 | -1.6 | 0.0 | 3.3 |
| 13(2) | -1.6 | 3.1 | 3.2 | 0.0 | 0.1 | -1.6 | 3.3 | 3.0 |
| 14(3) | -1.6 | 3.4 | 6.3 | -0.4 | 0.0 | -2.0 | 6.3 | 3.2 |
| 15(4) | -4.4 | 3.1 | 9.7 | -0.2 | -0.2 | -1.8 | 9.5 | 0.0 | though the width of the pattern or the length of the pattern is
COORDINATE DATA GENERATOR, SEWING MACHINE, AND NON-TRANSITORY RECORDING MEDIUM This application is based on and claims the benefit of priority to Japanese Patent Application No. 2018-128399 filed on Jul. 5, 2018, the contents of which are hereby incorporated by reference in their entirety.

TECHNICAL FIELD

The present invention relates to a coordinate data generator, a sewing machine, and a program.

BACKGROUND ART

Generally a seam on a sewing machine has a position determined by amplitude of needle positions and amounts of cloth feed.

Thus patterns are created by joining needle positions together with thread.

The needle positions are based on the figure to be sewn, needle positions are determined for each stitch, and data input is performed.

Namely, fundamentally, sewing data are often produced so as to be able to accurately reproduce an original figure using seams.

This then enables the original figure to be drawn according to the sewing data using seams by connecting together needle positions in straight lines and curves.

This means that anyone is able to accurately reproduce a pattern as long as they use a sewing machine, and anyone is able to form a beautiful pattern on a cloth that looks as if it has been sewn by a sewing expert.

However conversely this has actually tends to give a mechanical and cold impression.

In order to address this issue, technology is disclosed in which a control variable is derived as a fluctuation 1/f for seam control variable variation of a sewing machine, and a variation element is added when driving a feed control motor and an amplitude control motor (see, for example, Patent Document 1).

Moreover, there is also technology disclosed to avoid a pattern from being greatly distorted, and this is achieved not by making adjustments by using a variation while producing the pattern, and instead by controlling an amplitude or feed adjustment amount every cycle (see, for example, Patent Document 2).

RELATED TECHNOLOGY DOCUMENTS

Patent Documents

Patent Document 1: Japanese Patent Publication 2852967
Patent Document 2: Japanese Patent Application Laid-Open (JP-A) No. 2011-245092

However, the technology disclosed in Patent Document 1 suffers from the issue that the sewing pattern is sometimes excessively distorted due to the control by adding the variation element to each stitch.

In particular, due to using relative movement amounts in the feed direction, there is a concern that there might be a strong effect and the pattern might become greatly distorted to the extent that it becomes difficult to know what the original design actually was.

Moreover, in the technology disclosed in Patent Document 2, when there are many stitches in a single cycle, there is still an issue that even were a cold impression to be avoided, a warm pattern would not be achieved due to changes made to the pattern being mechanical changes, in which the width of the pattern or the length of the pattern is merely changed for each cycle, and there is no variation to each stitch.

SUMMARY OF INVENTION

One or more aspects of the present invention are directed to a coordinate data generator, a sewing machine, and a program that are able to create seams that deliver a hand-drawn-effect in a sewing pattern and give a warm fuzzy feeling by imparting an appropriate amount of variation to each stitch.

First Aspect: one or more exemplary embodiments of the present invention provides a sewing machine coordinate data generator to generate coordinate data of absolute positions configured by X coordinate values and Y coordinate values of needle positions for a pattern to be sewn, the coordinate data generator comprising: a coordinate data storage to store the coordinate data; and a post-addition coordinate data generation section to respectively add independent values to the X coordinate value or the Y coordinate value of the coordinate data for each item of the coordinate data stored in the coordinate data storage, so as to generate new coordinate data in which the pattern has been distorted.

Second Aspect: one or more exemplary embodiments of the present invention provides the coordinate data generator, wherein when items of coordinate data that are the same as each other are present in sewing data including a sewing sequence and coordinate data corresponding to the sewing sequence, independent values respectively added to the X coordinate value or to the Y coordinate value of one item of the same coordinate data are set at the same values as the values respectively added to the X coordinate value or to the Y coordinate value of another item of the same coordinate data at another place in the sewing sequence.

Third Aspect: one or more exemplary embodiments of the present invention provides the coordinate data generator, wherein the independent values respectively added to the X coordinate value or to the Y coordinate value of the coordinate data are different for each pattern of a plurality of the patterns.

Fourth Aspect: one or more exemplary embodiments of the present invention provides the coordinate data generator further comprising: a post-addition pattern display section to display a pattern of new coordinate data generated by the post-addition coordinate data generation section; and a coordinate data processing section to save or edit the coordinate data for each pattern of a plurality of the pattern being displayed on the post-addition pattern display section.

Fifth Aspect: one or more exemplary embodiments of the present invention provides the coordinate data generator, wherein the independent values respectively added to the X coordinate value or the Y coordinate value of the coordinate data are each a random number lying within a prescribed range.

Sixth Aspect: one or more exemplary embodiments of the present invention provides the coordinate data generator, wherein the independent values respectively added to the X coordinate value or the Y coordinate value of the coordinate data are each a positive value or a negative value lying within a prescribed range.

Seventh Aspect: one or more exemplary embodiments of the present invention provides the coordinate data generator, wherein a spacing between the X coordinate value of the coordinate data generated by the post-addition coordinate data generation section and the X coordinate value of the coordinate data adjacent in the sewing sequence generated by the post-addition coordinate data generation section is a value lying within a restricted range of a sewing mechanism of the sewing machine.

Eighth Aspect: one or more exemplary embodiments of the present invention provides a sewing machine comprising the coordinate data generator.

Ninth Aspect: one or more exemplary embodiments of the present invention provides a non-transitory recording medium recorded with a program to cause a computer to execute a coordinate data generation method that is performed in a sewing machine coordinate data generator including a coordinate data storage to store coordinate data and a post-addition coordinate data generation section, and that generates coordinate data of absolute positions configured by X coordinate values and Y coordinate values of needle positions for a pattern to be sewn, wherein: the program recorded on the non-transitory recording medium causes the computer to execute processing in which the post-addition coordinate data generation section respectively adds independent values to an X coordinate value or a Y coordinate value of coordinate data for each item of the coordinate data stored in the coordinate data storage, and generates new coordinate data in which the pattern has been distorted.

One or more exemplary embodiments of the present invention exhibits the advantageous effect of being able to generate seams that deliver a hand-drawn-effect in a sewing pattern and give a warm fuzzy feeling by imparting an appropriate amount of variation to each stitch.

Namely, seams are obtained that impart a sort of warm fuzzy feeling without what is referred to as the rigidity and coldness particular to mechanical sewing when sewing has hitherto been performed by a sewing machine.

Moreover, it is possible to give the impression of being hand sewn by a sewing novice, a child, or the like even though actually sewn by the same such sewing machine.

Note the same technology also enables a warm pattern to be embroidered by changing data format to an embroidery format.

BRIEF DESCRIPTION OF DRAWINGS

FIG. 5 is a diagram illustrating an example of a table of needle positions for simple stitching according to an Example 1 of the present invention.

FIG. 8 is a diagram illustrating an example of a table of needle positions for stitching according to an Example 2 of the present invention, in which needle positions are present at the same position as each other.

DESCRIPTION OF EMBODIMENTS

Exemplary Embodiments

Description follows regarding exemplary embodiment of the present invention, with reference to FIG. 1 to FIG. 4.

Electrical Configuration of Coordinate Data Generator

An electrical configuration of a coordinate data generator 10 according to an exemplary embodiment will now be described, with reference to FIG. 1.

Figure 1:
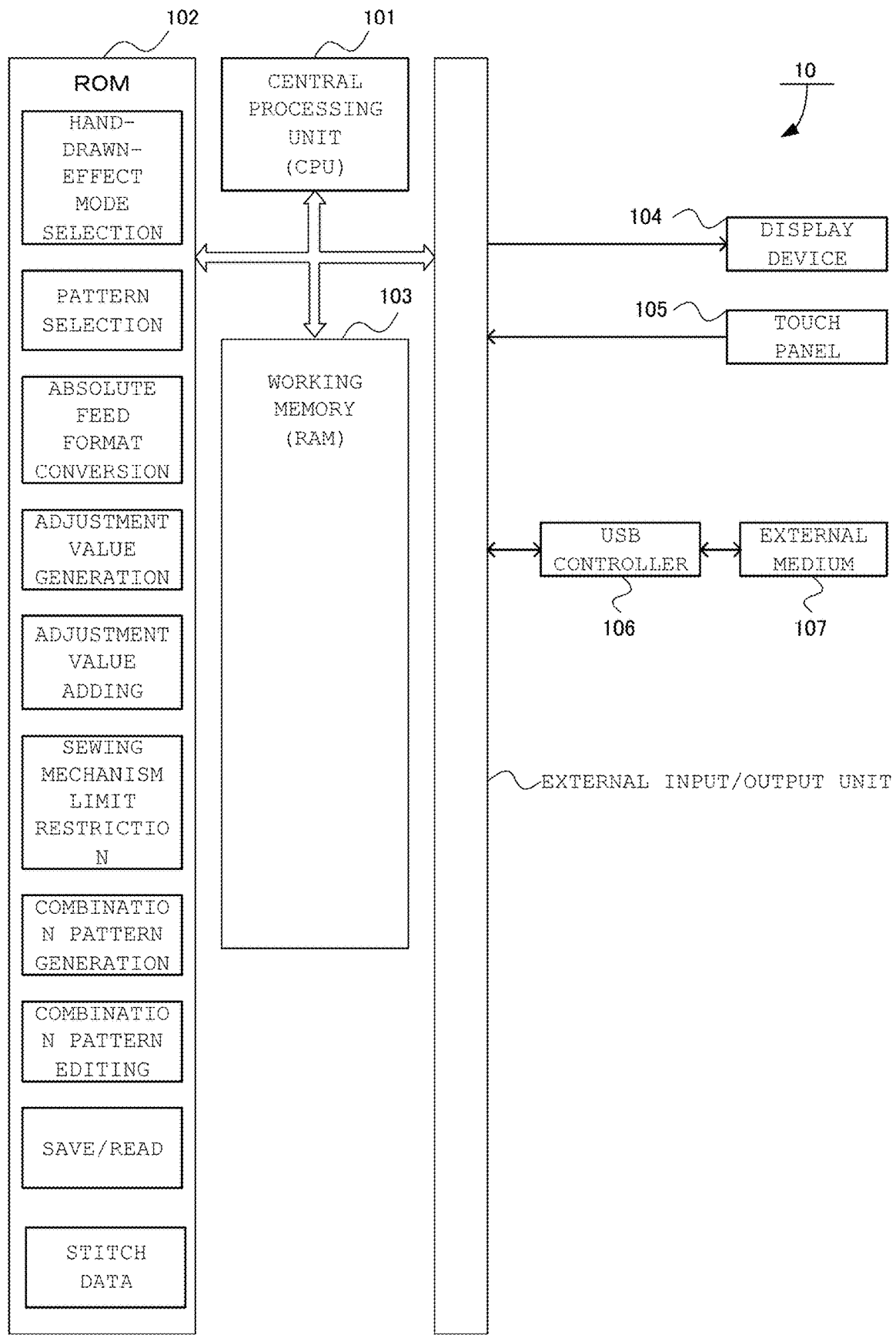
FIG. 1 is an electrical block diagram of a coordinate data generator according to an embodiment of the present invention.

The coordinate data generator 10 according to the present exemplary embodiment is, as illustrated in FIG. 1, configured including a central processing unit (CPU) 101, ROM 102, working memory (RAM) 103, a display device 104, a touch panel 105, a USB controller 106, and an external medium 107.

The central processing unit (CPU) 101 controls the overall operation of the coordinate data generator 10 according to a control program stored on the ROM 102.

The CPU 101 is also connected to various devices through an external input/output unit. The ROM 102 and the RAM 103 function as a storage (storage section) for storing functional modules.

The ROM 102 is stored with data, and functional modules, such as a hand-drawn-effect mode selection module, a pattern selection module, an absolute feed format conversion module, an adjustment value generation module, an adjustment value adding module, a sewing mechanism limit restriction module, a combination pattern generation module, a combination pattern edit module, a save/read module, a stitch data store area, and the like.

Figure 3:
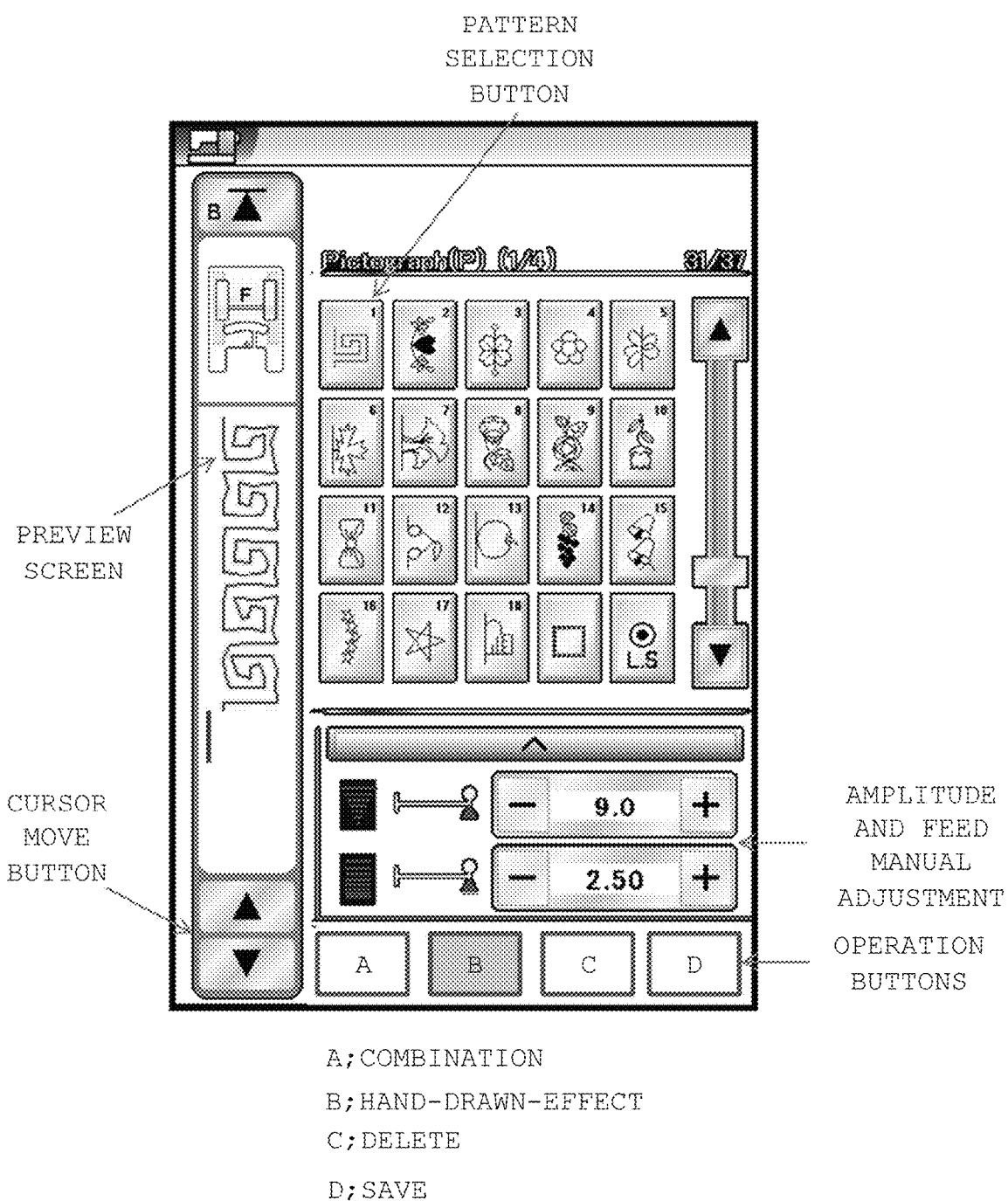
FIG. 3 is a diagram illustrating an example of an operational screen during screen operation in a coordinate data generator according to an exemplary embodiment of the present invention.

The display device 104 displays, for example, an operational screen such as that illustrated in FIG. 3.

The display device 104 is electrically connected to the central processing unit (CPU) 101 through the external input/output unit.

The touch panel 105, described below, has a multilayer structure superimposed at the lower side of a display face of the display device 104, with the touch panel 105 and the display device 104 being unitized into a "display section".

Patterns and text, buttons, and the like are displayed on the display device 104.

The touch panel 105 is configured by an electrostatic capacitance type of panel, a resistance film type of panel, or the like, and is electrically connected to the CPU 101 through the external input/output unit.

In consideration of the convenience of user operation, the touch panel 105 is disposed exposed at an external portion of the coordinate data generator 10 so as to be operable thereon.

The user is able to operate the touch panel 105 by finger touch while confirming hand-drawn-effect mode selection, pattern selection, and the like on the screen.

In the present exemplary embodiment, for example, the hand-drawn-effect mode selection module becomes active when a user presses the "hand-drawn-effect" button on the operational screen of FIG. 3, so as to finely adjust stitch data of a subsequently selectable pattern using a hand-drawn-effect stitch conversion function.

More specifically, the pattern selection module becomes active when the "pattern selection" button is operated on the operational screen of FIG. 3.

For example, when a number 1 button is pressed, the pattern of pattern number 1 installed in the ROM 102 of the coordinate data generator 10 is selected, and a single cycle worth of stitch data is read therefrom.

When the absolute feed format conversion module is active, the central processing unit (CPU) 101 converts stitch data in relative feed amounts into an absolute coordinate data format, which is the cumulative sum of these feed amounts.

A detailed description of this processing is described later.

When the adjustment value generation module is activated by the central processing unit (CPU) 101, integer random numbers are generated, and the random numbers are converted into length units of 0.1 mm calibration units.

A detailed description of this processing is described later.

When the adjustment value adding module is activated by the central processing unit (CPU) 101, the adjustment lengths derived from the random numbers are respectively added to the original amplitude values and original absolute feed data.

However, if the computed result thereof exceeds a limit value of the sewing mechanism, the sewing mechanism limit restriction module becomes active, and adding is not performed.

Moreover, when a plurality of identical coordinates are present in the original data, then same-position processing is performed to use the already adjusted coordinate so that the adjusted coordinates still match each other.

A detailed description of this processing is described later.

When the hand-drawn-effect processing has been executed on a single cycle worth of data, the combination pattern generation module is activated by the central processing unit (CPU) 101, and the generated combination pattern is temporarily stored in the working memory (RAM).

A single cycle of a pattern converted using the hand-drawn-effect is displayed on a preview screen on the operational screen of FIG. 3.

When the same pattern is reselected, fine adjustment is performed thereon using a different random number, and the result is drawn on the preview screen as a second cycle.

When the combination pattern edit module is activated by the central processing unit (CPU) 101 this enables pattern deletion and addition, and enables changes etc. to be made to the combination.

Note that fine adjustment using a different random number is also performed on an added pattern.

The combination pattern can be written to the external medium 107 or the like when the save/read module is activated by the central processing unit (CPU) 101.

This enables sewing to be reproduced even though the patterns have been adjusted using random numbers.

Various functional modules read from the ROM 102, such as an OS and basic library, for example, are temporarily stored in the RAM 103.

Moreover, data to be shared in work by the central processing unit (CPU) 101 is also temporarily stored and saved therein.

The universal serial bus (USB) controller 106 connects the coordinate data generator 10 to external devices such as the external medium 107 and controls the connection thereto.

The external medium 107 is, for example, a hard disk, a DVD recorder, or the like, and pattern data and the like is written to, and saved on, the external media 107 under control of the USB controller 106.

The central processing unit (CPU) 101 sequentially executes program modules stored on the ROM 102 so as to, for example, convert ordinary sewing data into hand-drawn-effect stitch data.

For example, the CPU 101 creates a hand-drawn-effect for a sewing pattern by moving each needle position of the ordinary sewing stitch data by fine distances in the X direction and the Y direction, and by performing fine adjustments of different lengths and direction on all of the needle positions.

More specifically, a coordinate array of needle positions in a sewing image is generated from the stitch data.

Then random numbers are generated to derive fine length correction values (±), and these lengths are then added to the coordinates in the X direction and the Y direction for each of the needle positions.

Furthermore, when there are needle positions that are at the same position as each other present in the original data, processing is performed to correct such that the needle positions after fine adjustment are also superimposed on each other, and to produce a combination pattern with stitches converted into a hand-drawn-effect.

A detailed description of this processing is described later.

Coordinate Data Generator Processing

Figure 2:
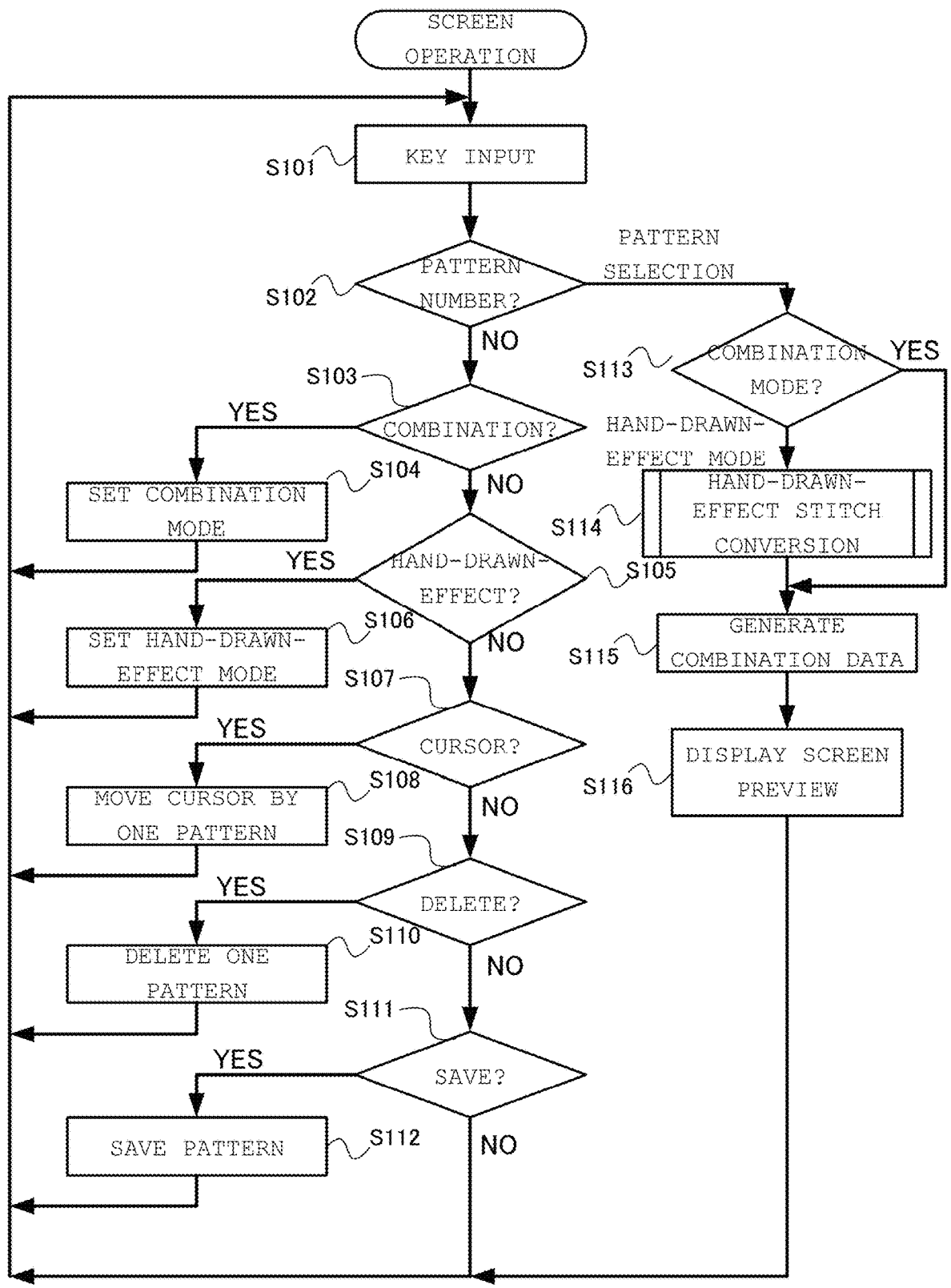
FIG. 2 is a flowchart of processing during screen operation in a coordinate data generator according to an embodiment of the present invention.
Figure 4:
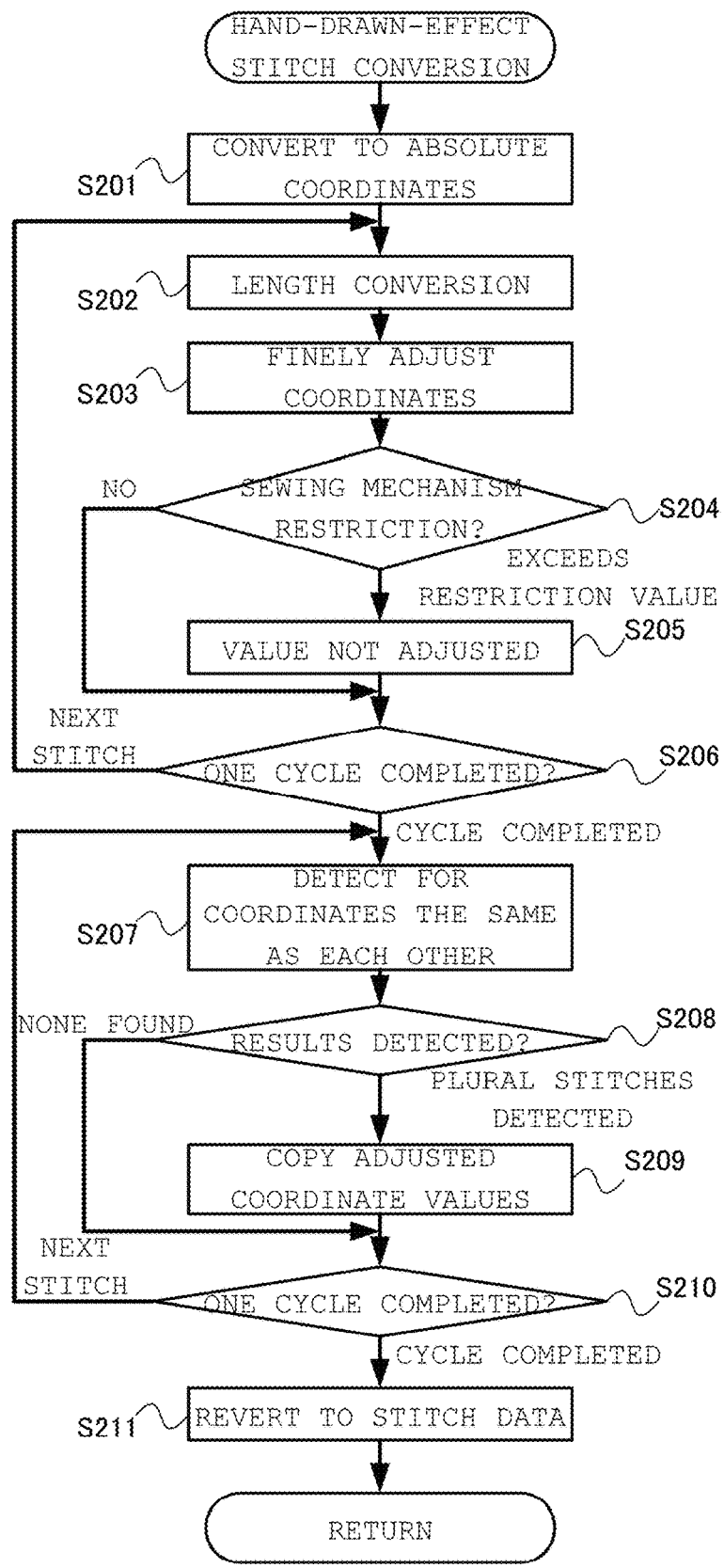
FIG. 4 is a flowchart of processing related to hand-drawn-stitching conversion in a coordinate data generator according to an exemplary embodiment of the present invention.

A description follows regarding details of screen operation processing and hand-drawn-effect stitch conversion processing in the coordinate data generator 10 according to the present exemplary embodiment, with reference to FIG. 2 to FIG. 4.

Screen Operation Processing

The generation of sewing data using the coordinate data generator 10 according to the present exemplary embodiment is performed by operating on a screen displayed on the display device 104 such as that illustrated in FIG. 3.

Screen operation processing for the coordinate data generator 10 according to the present exemplary embodiment will accordingly be described, with reference to FIG. 2, before describing details regarding the processing of the coordinate data generator 10.

When a display mode to display an operation screen such as that illustrated in FIG. 3 on the display device 104 is selected by a user, first the central processing unit (CPU) 101 of the coordinate data generator 10 transitions to a standby mode awaiting pressing of an operation button, a cursor button, a pattern button, or the like by key input by the user (step S101).

Next, the central processing unit (CPU) 101 determines whether or not a pattern has been selected by the user (step S102).

When the determination result by the central processing unit (CPU) 101 is that the user has selected a pattern, namely, when determined that the user has input a pattern number or the like, a determination is then made as whether or not this selection is to be subjected to combination mode processing or hand-drawn-effect mode processing (step S113).

Note that processing is performed and patterns stored in the selected sequence for both combination mode processing and hand-drawn-effect mode processing.

Returning to step S102, when the determination result by the central processing unit (CPU) 101 is that a pattern has not been selected by the user, namely, when determined that a pattern number or the like has not been input by the user (step S102="No"), then the combination mode is set if the combination button has been pressed (step S103="Yes"), and processing returns to step S101 (step S104).

However, when the central processing unit (CPU) 101 has determined at step S103 that the user has not pressed the combination button (step S103="No"), then determination is made as to whether or not the user has pressed the hand-drawn-effect button (step S105).

When the central processing unit (CPU) 101 has determined at step S105 that the user has pressed the hand-drawn-effect button (step S105="Yes"), then the hand-drawn-effect mode is set (step S106), and processing then returns to step S101.

However, when the central processing unit (CPU) 101 has determined at step S105 that the user has not pressed the hand-drawn-effect button (step S105="No"), then determination is made as to whether or not the user has pressed the cursor button (step S107).

When the central processing unit (CPU) 101 has determined at step S107 that the user has pressed the cursor button (step S107="Yes"), then the cursor is advanced or retreated along a pattern array stored in a pattern selection module (step S108), and processing then returns to step S101.

However, when the central processing unit (CPU) 101 has determined at step S107 that the user has not pressed the cursor button (step S107="No"), then determination is made as to whether or not the user has pressed a delete button (step S109).

When the central processing unit (CPU) 101 has determined at step S109 that the user has pressed the delete button (step S109="Yes"), then the pattern at the displayed position of the cursor is deleted and subsequent patterns are promoted toward the start of the array (step S110), and processing then returns to step S101.

However, when the central processing unit (CPU) 101 has determined at step S109 that the user has not pressed the delete button (step S109="No"), then determination is made as to whether or not the user has pressed a save button (step S111).

When the central processing unit (CPU) 101 has determined at step S111 that the user has pressed the save button (step S111="Yes"), then the pattern converted by the hand-drawn-effect and the combination pattern are saved on an external medium or the like so as to enable subsequent re-utilization, and processing returns to step S101 (step S112).

However, when the central processing unit (CPU) 101 has determined at step S111 that the user has not pressed the save button (step S111="No"), then processing returns to step S101.

When the central processing unit (CPU) 101 has determined at step S113 that the user has pressed a pattern button in hand-drawn-effect mode (step S113), then a hand-drawn-effect stitch conversion processing routine is called (step S114).

Details regarding the hand-drawn-effect stitch conversion processing are described below.

However, when the central processing unit (CPU) 101 has determined at step S113 that the user has pressed the combination mode button (step S113="Yes") or the hand-drawn-effect stitch conversion processing of step S114 has been completed, then the pattern data is combined (step S115) similarly to in ordinary pattern combination.

At step S116 the central processing unit (CPU) 101 then displays a preview screen on the display device 104.

This thereby enables a user to confirm the converted state.

Note that handling the pattern converted by the hand-drawn-effect mode in the same manner to an ordinary pattern enables editing operations such as deletion and addition to be performed.

Hand-Drawn-Effect Stitch Conversion Processing

Details regarding the hand-drawn-effect stitch conversion processing will now be described with reference to FIG. 4.

The hand-drawn-effect stitch conversion processing includes "variation processing", "same-position processing", and "combination editing processing".

An outline description will now be given for the above three types of processing, before describing details of hand-drawn-effect stitch conversion processing, with reference to FIG. 4.

Variation Processing

The coordinates of needle positions cannot be adjusted while feed direction data is still only stated as relative movement amounts.

In the variation processing, relative movement amounts are first converted into a data array of absolute coordinates indicating the needle positions in the stitch data.

An absolute coordinate array using orthogonal coordinates is thereby derived for a single cycle or for plural cycles.

Then random numbers are generated, and adjustment amounts of, for example, ±1 mm or less are prepared for adjusting each of the needle positions so as to shift the X coordinates and the Y coordinates of the needle positions.

Note that there is no limitation to cases in which random number generation is performed each time, and pre-generated adjustment data may be held in a table format.

Adjustment amounts that have derived from the generated random numbers so as to lie in a range of, for example, ±1 mm are then added to the absolute coordinate data array indicating the needle positions.

In the adjusted coordinate data, the amplitude direction is restricted so as to be accommodated in the width of the sewing mechanism, and the feed direction is also restricted such that a distance from the immediately previous stitch is not more than a prescribed distance.

The data array of absolute coordinate needle positions is converted into relative movement amounts in the feed direction so as to be reverted to a stitch data format for ordinary sewing.

Note that an example will now be described in which the width of the sewing mechanism in the amplitude direction is 8.8 mm, and the distance restriction to the immediately previous stitch in the feed direction is 5 mm.

Same-Position Processing

Depending on the shape of the pattern, stitch data is often produced with a form that passes through the same position plural times.

In such cases, the shape of the original pattern will be lost if the X coordinates and the Y coordinates of the needle positions are shifted without restriction for every needle position.

To address this issue, when plural individual needle positions are present at the same position as each other, positional control is performed such that these positions are still at the same position even after performing the conversion processing.

Combination Editing Processing

The X coordinate and the Y coordinate of needle positions are imparted with a variation using different random numbers for each cycle of pattern, and the plural individual patterns are then combined.

In order to record combination contents, the user presses the combination button on the operation screen illustrated in FIG. 3.

New random numbers are generated by this pattern selection operation, and patterns that were originally the same have their X coordinates and Y coordinates of their needle positions shifted in a different manner at each pattern selection, so as to produce plural combination patterns.

The user previews the appearance of the converted stitch data, and adopts patterns generated with needle position X coordinates and Y coordinates that they consider to be favorably shifted.

Note that when the user determines that none of the patterns generated have what they consider to be favorably shifted needle position X coordinates and Y coordinates, then an operation such as deletion may be performed, and the combination pattern may also be edited on the screen.

Moreover, the user may select whether to impart variation derived using random numbers to the needle position X coordinates and Y coordinates or to impart variation from a table to the needle position X coordinates and Y coordinates.

Hand-Drawn-Effect Stitch Conversion Processing Details

In order to execute such processing, the user presses the "hand-drawn-effect" button on the operation screen being displayed on the display device 104, such as that illustrated in FIG. 3, to set the hand-drawn-effect combination mode.

The user then presses the pattern selection button and to select a pattern.

First the central processing unit (CPU) 101 of the coordinate data generator 10 converts the stitch data of the pattern selected by the user that is stated in relative movement amounts for the feed direction, into an absolute coordinate data array by performing cumulative processing on these relative feed amounts (step S201).

The central processing unit (CPU) 101 acquires two random numbers to be employed respectively for amplitude and for feeding.

Due to random numbers obtained at this point being integers, the integer random numbers are then converted into adjustment lengths within a range of ±1.0 mm (step S202).

The central processing unit (CPU) 101 performs fine adjustment by adding the adjustment lengths converted at step S202 to the coordinates in the amplitude direction and the feed direction (step S203).

However, so that the fine adjustments do no exceed the limits of the sewing mechanism, the central processing unit (CPU) 101 determines whether or not a spacing between the value of the Y coordinate in the coordinate data after fine adjustment or the value of the X coordinate in the coordinate data after fine adjustment, and the value of the Y coordinate or the value of the X coordinate of the coordinate data adjacent in the sewing sequence after fine adjustment, lies inside the restrictions of the sewing mechanism (step S204).

The fine adjustment processing of step S203 is cancelled in cases in which the value of the Y coordinate of the finely adjusted coordinates exceeds the restrictions of the sewing mechanism in the amplitude (Y coordinate) direction (step S205).

Moreover, the fine adjustment processing of step S203 is also cancelled in cases in which the spacing between the value of the X coordinate of the finely adjusted coordinate data and the value of the X coordinate of the finely adjusted coordinate data adjacent in the sewing sequence exceeds the restrictions of the sewing mechanism in the feed (X coordinate) direction (step S205).

An example here of illustrative values for the restrictions of the sewing mechanism in the amplitude direction is, for example, −4.4 mm and +4.4 mm, and an example of values for the restrictions of the sewing mechanism in the feed direction is, for example, a relative movement amount of −5.0 mm and +5.0 mm.

The values given above relate to the restrictions during ordinary sewing, however, the fine adjustment processing of step S203 is also cancelled in cases in which the spacing between values of the finely adjusted coordinate data and the values of the finely adjusted coordinate data adjacent thereto in the sewing sequence exceeds the restrictions of the sewing mechanism in the X coordinate direction or the Y coordinate direction for embroidery sewing as well (step S205).

Processing transitions to step S206 when the restrictions of the sewing mechanism have not been exceeded in either the amplitude direction or the feed direction of the coordinates after fine adjustment.

The central processing unit (CPU) 101 determines whether or not one cycle of stitching has been completed (step S206).

Processing returns to step S202 when the central processing unit (CPU) 101 has determined that there is still a stitch remaining.

In such cases, the central processing unit (CPU) 101 generates new random numbers for the next needle position and executes steps S202 and S203.

However, when the hand-drawn-effect conversion processing has been completed for one cycle worth of stitches, the central processing unit (CPU) 101 detects for coordinates that are the same as each other to perform data correction (step S207).

More specifically, a search is performed for stitch numbers having coordinates that match each other in the original data prior to adjustment.

For example, a search is made for any stitch number having coordinates matching coordinates of the first stitch all the way up to the last stitch.

When there is a single or plural individual instances of the same coordinates detected in the search results (step S208), the central processing unit (CPU) 101 copies the adjusted coordinates (as a sole coordinate) to the detected needle position (step S209).

That is, the adjusted coordinate(s) is applied as the finely adjusted coordinate for the stick number for the first stitch.

Processing then returns to step S207 for the central processing unit (CPU) 101 to perform processing for the next stitch, and for the second stitch onwards similar processing to the processing described above is performed.

Namely, any stitch numbers having coordinates that match each other in the original data are corrected so as to still have the same coordinates as each other even after fine adjustment.

Then when determined that the first cycle has been completed (step S210), the central processing unit (CPU) 101 converts the feed data that is now in absolute coordinates due to the fine adjustment processing into relative movement amounts so as to be reverted to stitch data format (step S211).

Example 1

Description follows regarding an Example 1 of the present invention, with reference to FIG. 5 to FIGS. 7A and 7B.

Note that in the present Example a description will be given regarding processing in the case of simple stitching.

Figure 6:
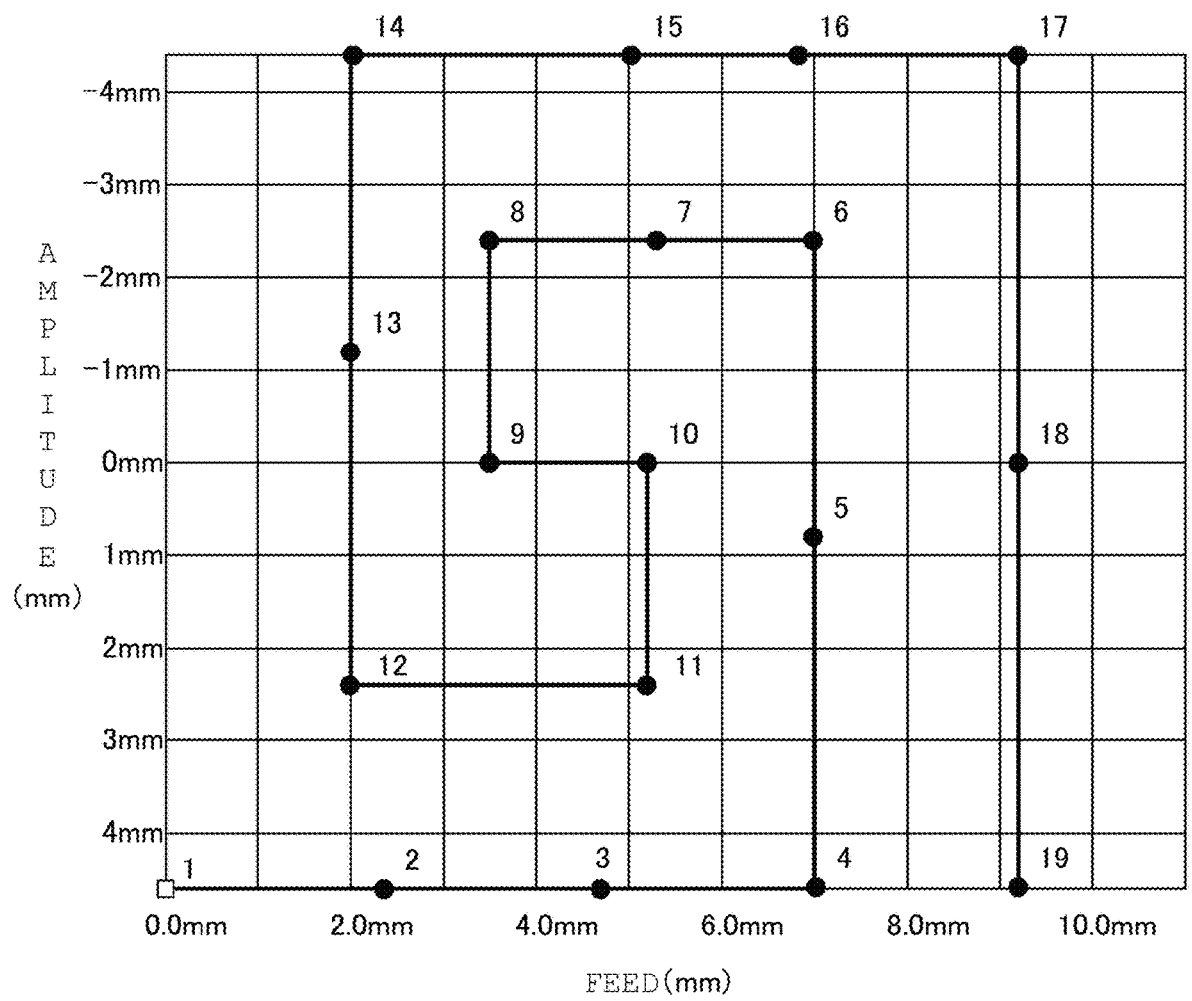
FIG. 6 illustrates an example of a plot (original data plot) prior to adjustment of needle position coordinates using random numbers for simple stitching according to the Example 1 of the present invention.

In the present Example, the sewing data for ordinary sewing, as illustrated in FIG. 6, has feed in the lateral direction and amplitude in the vertical direction. Taking the center in the amplitude direction as 0.0 mm, the sewing data is configured from coordinate data of a needle that swings to the left and right with amplitude positions of from −4.4 mm to +4.4 mm, and from data for feeding cloth forward and backward using a feed dog with relative movement amounts of from −5.0 mm to +5.0 mm.

Moreover, the relationships between amplitude and relative feed in the original data is as illustrated in FIG. 5.

FIG. 5 lists original data for data elements of amplitude and relative feed, and absolute feed, which is the cumulative sum of relative feed, an example of random number adjustment lengths used for amplitude and for feed, and an example of values for amplitude, absolute feed, and relative feed after performing hand-drawn processing on the original data.

More specifically, the random number adjustment length used for the amplitude of the second stitch is 0.6, and due to this exceeding the sewing mechanism limit, the value of 0.6 is cancelled, and the value 4.4 of the original data is employed as is for the value of the amplitude after performing the hand-drawn processing on the second stitch.

Moreover, the value of absolute feed after the hand-drawn processing has been performed for the second stitch becomes 2.5 due having a feed random number adjustment amount of 0.2 for the absolute feed value in the original data of 2.3.

Moreover, the value of the relative feed after the hand-drawn processing has been performed on the second stitch is 2.2, due to the value of absolute feed after the hand-drawn processing has been on the second stitch being 2.5, and the value for the absolute feed for the third stitch after the hand-drawn processing has been performed being a value of 4.7 in the original data.

Moreover, the value of the amplitude after the hand-drawn processing has been performed on the fifth stitch is 0.6 due to the random number adjustment amount for amplitude being −0.2 for the value of 0.8 in the original data.

The value of the absolute feed after the hand-drawn processing has been performed for the fifth stitch is 7.2 due to the random number adjustment amount for feed being 0.2 for the value of 7.0 in the original data.

Moreover, the value of relative feed after performing the hand-drawn processing on the fifth stitch is −0.5 due to the absolute feed value after performing the hand-drawn processing of the sixth stitch being 6.7, and the value of the absolute feed after performing the hand-drawn processing on the fifth stitch being a value of 7.2 in the original data.

Description follows regarding details of the processing content according to a specific example of FIG. 6.

In the present Example, the cloth is moved by the feed dog every stitch, so as to form units of pattern from several millimeters to several tens of millimeters.

A long pattern of plural cycles can be sewn by successively repeating sewing of such unit patterns.

The pattern of a single cycle can be represented by a data array of absolute coordinates such as those illustrated in FIG. 5 by taking cumulative sums of feed data stated in relative distances.

The coordinates for amplitude and absolute feed of FIG. 5 represent the coordinates of the needle positions in FIG. 6.

In the present Example, the X coordinates and Y coordinates of each of the needle positions are finely adjusted with numerical values derived from random numbers in order to give a hand-drawn-effect.

Random numbers are accordingly generated for adjusting values in the amplitude direction and for adjusting values in the feed direction at each of the stitch positions.

The random numbers employed here are integer values from 0 to 32767, and these numerical values are converted into values of from −1.0 mm to +1.0 mm as length adjustment values. Such conversion is performed, for example, using the following Equation 1.

$$\text{adjust} = ((\text{random } \%21) - 10)/10 \text{ (mm)} \qquad \text{Equation 1}$$

Wherein adjust is an adjustment value, random is a random number, and % indicates a modulo operation.

In the example given above, 10 is subtracted from the remainder resulting from dividing the random number value (random) by 21, before then dividing the result by 10, thereby enabling adjustment values to be produced in 0.1 mm units of from −1.0 mm to +1.0 mm.

Moreover, as an example, results from generating random numbers and converting the random numbers into adjustment lengths using Equation 1 for use in amplitude and feed at each of the needle positions are listed in the "random number adjustment lengths for amplitude, for feed" columns in FIG. 5.

These adjustment values are added to each of the coordinates of the "original data amplitude, absolute feed" to adjust the coordinates.

However, when the result of addition would exceed the limit values of the sewing mechanism (this occurring at the shaded locations in FIG. 5), the addition is cancelled and addition is not performed.

Examples of the results after adjustment are listed in the "hand-drawn processing amplitude, absolute feed" columns in FIG. 5.

Furthermore, relative feed amounts are derived from the absolute feeds, and are recorded in list format, as illustrated in FIG. 5, so as to convert the data array of "hand-drawn processing amplitude, relative feed" into pattern data for ordinary sewing.

Note that when emphasis is to be placed on reproducibility in the way in which distortion in the hand-drawn-effect patterns is performed, then instead of using random numbers, numerical values having a certain variation may be held in a table.

Figure 7A:
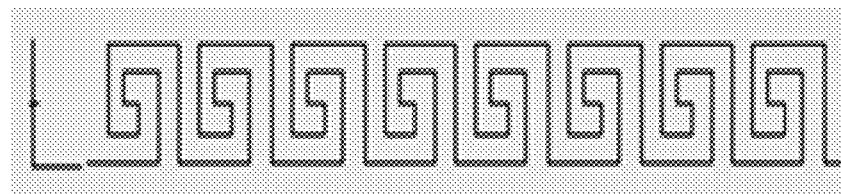
FIGS. 7A and 7B are drawings illustrating an image of original sewing and an image of hand-drawn sewing for simple stitching according to the Example 1 of the present invention.
Figure 7B:
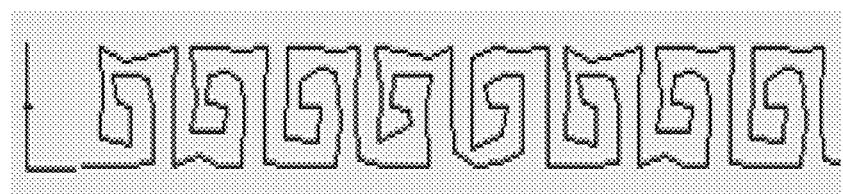

FIGS. 7A and 7B are drawings illustrating a stitch pattern of ordinary sewing (FIG. 7A) and a stitch pattern after processing (FIG. 7B).

Example 2

Description follows regarding an Example 2 of the present invention, with reference to FIG. 8 to FIGS. 10A, 10B, and 10C.

Note that in the present Example, a description will be given regarding processing in a case in which stitches are present with needle positions at the same positions as each other.

FIG. 8 lists original data for data elements of amplitude and relative feed, absolute feed, which is the cumulative sum of relative feed, an example for random number adjustment lengths for amplitude and for feed, and an example of values for amplitude, absolute feed, and relative feed after performing the hand-drawn processing on the original data.

More specifically, the value of amplitude after performing the hand-drawn processing on the second stitch remains at −1.6, due to having a random number adjustment amount for amplitude of 0.0 for original data with a value of −1.6.

Moreover, the value of absolute feed after the hand-drawn processing has been performed for the second stitch becomes 3.3 due having a feed random number adjustment amount of 0.1 for original data with a value of 3.2.

Moreover, the value of the relative feed after the hand-drawn processing has been performed on the second stitch is 3.0, due to the value of absolute feed after the hand-drawn processing has been performed for the second stitch being 3.3 and the value for the absolute feed after the hand-drawn processing has been performed for the third stitch being a value of 6.3 in the original data.

Moreover, due to the random number adjustment length for amplitude being 0.4 for the seventh stitch, which would mean that the sewing mechanism limit would be exceeded, the value of 0.4 is accordingly cancelled, and the value employed for the amplitude after the hand-drawn processing has been performed on the seventh stitch is taken as being the original data value of 4.4.

Figure 9:
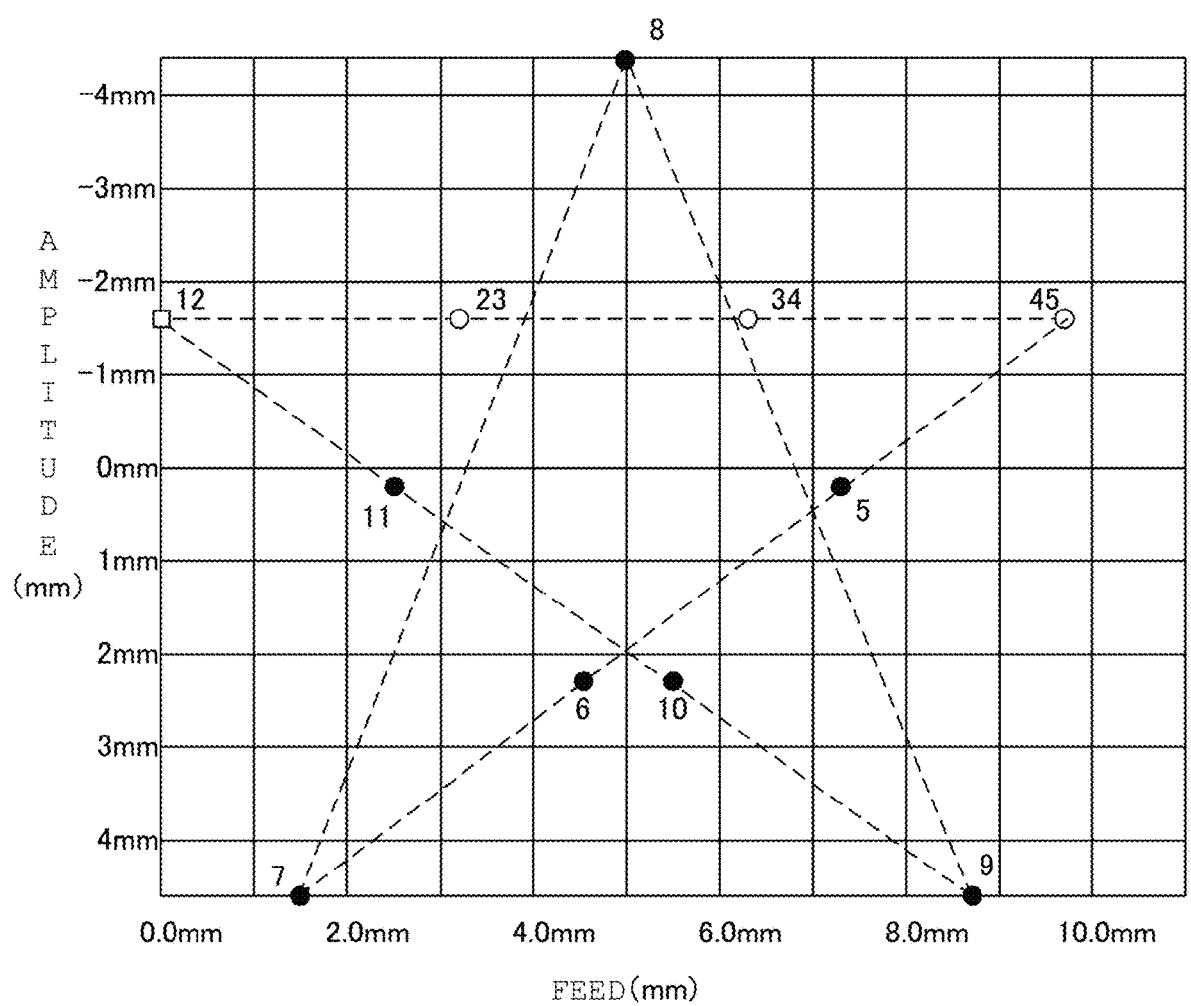
FIG. 9 illustrates an example of a plot (original data plot) prior to adjustment of needle position coordinates using random numbers for simple stitching according to the Example 2 of the present invention, in which needle positions are present at the same position as each other.

Description follows regarding details of the processing content according to a specific example of FIG. 9.

When generating sewing data, sometimes it is desirable to pass through the same position plural times depending on the shape of the design.

When the pattern is a star as illustrated in FIG. 10, there are four locations in the original stitch data where sewing is performed with needle positions that are superimposed on each other.

Figure 10A:
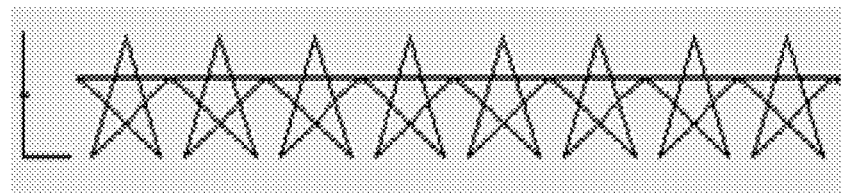
FIGS. 10A, 10B, and 10C are drawings illustrating examples of an image of original sewing and images of hand-drawn-stitching for stitching according to the Example 2 of the present invention, in which needle positions are present at the same position as each other.
Figure 10B:
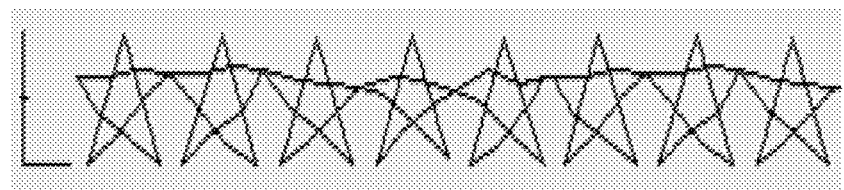
Figure 10C:
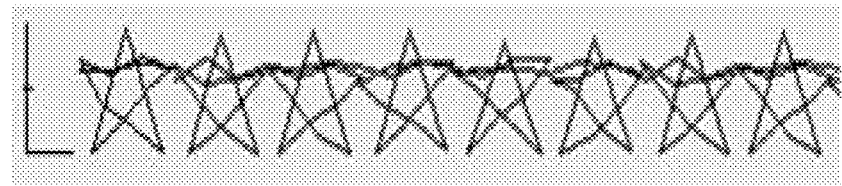

This might result in sewing as in the image of FIG. 10C, resulting in ugly seams, unless these superimposed positions were subjected to special processing.

Thus the following processing is performed in the present Example in order to address the above issue.

First, a cumulative sum of relative distance feed data is computed for a single cycle pattern, enabling representation as a data array of absolute coordinates, such as those of the "original data amplitude and absolute feed" listed in FIG. 8.

A search of this data array for needle positions that are superimposed on each other reveals that in the "original data" of FIG. 8, the first stitch and the twelfth stitch (this position being labeled "12" in FIG. 9) have the same coordinates as each other, and are superimposed needle positions.

Similarly, it is apparent therefrom that the second stitch and the thirteenth stitch (this position being labeled "23" in FIG. 9), the third stitch and the fourteenth stitch (this position being labeled "34" in FIG. 9), the fourth stitch and the fifteenth stitch (this position being labeled "45" in FIG. 9), are respectively formed at the same positions when a seam is being formed for the second time.

Adjustment lengths are then derived using random numbers, with an example thereof listed as "random number adjustment lengths for amplitude, for feed" in FIG. 8.

Then these adjustment values are added to the "original data amplitude and absolute feed" of FIG. 8 to perform hand-drawn processing. However, in cases in which the sewing mechanism limit would be exceeded (the shaded locations in FIG. 8), the addition is cancelled and not performed.

The adjusted amplitudes and absolute feeds are then recorded for each stitch, as in the example of "hand-drawn processing amplitude and absolute feed" of FIG. 8, and when there are stitches present that are at the same position as each other in the "original data" of FIG. 8, one or other of the adjusted values is employed for both stitches, this being processing such that they are at the same coordinates as each other even after adjustment.

In the example of FIG. 8, due to the needle positions for the first stitch and the twelfth stitch originally being at the same position as each other, the adjusted result of the first stitch is, for example, also applied to the twelfth stitch so that their coordinates still match after adjustment.

Similar processing is also performed for the second stitch and the thirteenth stitch, for the third stitch and the fourteenth stitch, and for the fourth stitch and the fifteenth stitch, such that the respective coordinates still match after adjustment.

Such processing enables shape deformation to be performed with a hand-drawn-effect while also maintaining the star shape, as illustrated in FIG. 10B.

Furthermore, relative feed amounts are derived from the absolute feeds and, as illustrated in FIG. 8, recorded in list format to give a data array such as the "hand-drawn processing amplitude, relative feed" in the example illustrated in FIG. 8, which is pattern data for ordinary sewing.

As described above, in the present exemplary embodiment and the present Example, the coordinate data generator includes a coordinate data storage to store coordinate data, and a post-addition coordinate data generation section that adds respective independent values to the value of the X coordinate or the value of the Y coordinate in the coordinate data for each item of coordinate data stored in the coordinate data storage so as to generate new coordinate data in which the pattern has been distorted. The coordinate data generator thereby generates coordinate data of absolute positions configured by the X coordinate values and the Y coordinate values of the needle positions of the pattern to be sewed.

Namely, the post-addition coordinate data generation section includes a function to generate new coordinate data in which the pattern has been distorted by adding respective independent values to the X coordinate value or the Y coordinate value in the coordinate data stored in the coordinate data storage.

Thus imparting an appropriate variation to each of the stitches enables seams to be generated that bring out a hand-drawn-effect in a sewing pattern, and give a warm fuzzy feeling.

Note that coordinate data referred to here encompasses coordinate data for both ordinary sewing or embroidery sewing.

Moreover, the processing to add respective independent values to the X coordinate value or the Y coordinate value in the coordinate data is processing in which respective independent values are added to X coordinate values and Y coordinate values in the coordinate data. In consideration that the independent values might be zero, for example, then this processing also encompasses adding such an independent value to either the X coordinate value or the Y coordinate value of the coordinate data.

Moreover, when there are coordinate data the same as each other present in the sewing data configured by a sewing sequence and coordinate data corresponding to the sewing sequence, for this same coordinate data, the independent values respectively added to the X coordinate value or the Y coordinate value of one of the same coordinate data are made to be the same values as the values respectively added to the X coordinate value or the Y coordinate value of the other of the same coordinate data in the sewing sequence.

Namely, when there are coordinate data the same as each other present in the sewing data configured by the sewing sequence and coordinate data corresponding to the sewing sequence, the same respective values are added to the X coordinate value or the Y coordinate value for the coordinate data that was the same as each other.

This thereby enables a pattern to be deformed with a hand-drawn-effect while still maintaining the original shape.

Moreover, for coordinate data that are the same as each other, a shift away from being at the same position can be prevented by making the values to be added thereto the same, even though they occur at different places in the sewing sequence, Furthermore, portions that are superimposed on each other in different patterns can be prevented from being shifted away from each other.

Moreover, the independent values respectively added to the X coordinate values or the Y coordinate values of the coordinate data are different for each of the patterns.

Namely, the independent values added differ for different patterns even for the coordinate data that is the same as each.

This thereby enables plural sets of sewing data to be generated for a given pattern due to the independent values respectively added to the X coordinate values or the Y coordinate values of the coordinate data differing from each other.

Moreover, the user is able to be presented with a wide selection range of favorable patterns due to the plural sewing data being generated for a given pattern.

The coordinate data generator includes a post-addition pattern display section to display patterns having the new coordinate data generated by the post-addition coordinate data generation section, and includes a coordinate data processing section to save or edit the coordinate data for each of the patterns of the patterns being displayed on the post-addition pattern display section.

Namely, due to the inclusion of the post-addition pattern display section to display the patterns having the new coordinate data generated by the post-addition coordinate data generation section, the outcome can be evaluated while the patterns having the new coordinate data are viewed.

Moreover, due to including the coordinate data processing section to save or edit the coordinate data for each of the patterns of the patterns being displayed on the post-addition pattern display section, the user is able to save the coordinate data for a preferred pattern while viewing the patterns having the new coordinate data displayed on the post-addition pattern display section.

Moreover, when the patterns having the new coordinate data displayed on the post-addition pattern display section are different from the taste of the user, the user is still able to save coordinate data of a pattern that is to the taste of the user by performing editing (such as, for example, deleting, moving, or modifying) the coordinate data to find such a pattern.

The independent values respectively added to the X coordinate values or the Y coordinate values of the coordinate data are also random numbers lying within a prescribed range.

Namely, plural irregular patterns can be generated by employing random numbers within a prescribed range as the independent values respectively added to the X coordinate values or the Y coordinate values of the coordinate data.

Moreover, arbitrary values are values within an arbitrary proportion of the length in component directions of the pattern.

More specifically, a wide range of selectable patterns to the taste of the user can be produced due to being able to generate plural irregular patterns.

Moreover, the independent values respectively added to the X coordinate values or the Y coordinate values of the coordinate data are positive values or negative values inside the prescribed range.

This enables patterns with a hand-drawn-effect to be sewn while preserving the original pattern shape.

Moreover, the spacings between X coordinate values of the coordinate data generated by the post-addition coordinate data generation section and the X coordinate values of the coordinate data adjacent in the sewing sequence generated by the post-addition coordinate data generation section are values within the restricted range of the sewing mechanism of the sewing machine.

Namely, even in cases in which the spacings between X coordinate values of the coordinate data generated by the post-addition coordinate data generation section and the X coordinate values of the coordinate data adjacent in the sewing sequence generated by the post-addition coordinate data generation section would exceed the restricted range of the sewing mechanism of the sewing machine, in order to strictly observe the sewing mechanism restricted range of the sewing machine which is an absolute restriction, the addition in the post-addition coordinate data generation section is, for example, cancelled when the restricted range of the sewing mechanism of the sewing machine has been exceeded.

This thereby enables a pattern with a hand-drawn-effect to be sewn while preserving the original pattern shape while also continuing to strictly observe the sewing mechanism restricted range of the sewing machine, which is an absolute restriction.

Note that the processing of the coordinate data generator may be recorded on a recording medium readable by a computer or a computer system, with the program recorded on the recording medium then read into the coordinate data generator, and the coordinate data generator of the present invention realized by then executing this processing. The computer system or computer referred to here encompasses an OS as well as hardware such as peripheral devices and the like.

Moreover, "computer system or computer" also encompass a home page provision environment (or display environment) for cases utilizing a world wide web (www) system. Moreover, the program referred to above may also be transmitted from one computer system or computer where the program is stored on a storage device or the like to another computer system or computer via a transfer medium, or via transmission waves through a transfer medium. Reference here to a "transfer medium" to transfer the program encompasses a network (communication network) such as the Internet, and a medium including a function for transferring information such a communications line (coms line) like a telephone line or the like.

Moreover, the program referred to above may be a program that implements part of the functions described above. Furthermore, the functions described above may be implemented in combination with a program already recorded on a computer system or computer, in what is referred to as an incremental file (incremental program).

Although detailed explanation has been given of exemplary embodiments of the present invention with reference to the drawings, specific configurations are not limited to these exemplary embodiments, and encompass any designs or the like not departing from the range of the spirit of the invention.

For example, the coordinate data generator may be a separate device such as a personal computer, or may be device built into a sewing machine or the like.

10 coordinate data generator
101 central processing unit (CPU)
102 ROM
103 working memory (RAM)
104 display device
105 touch panel
106 USB controller
107 external medium

The invention claimed is:

1. A sewing machine coordinate data generator to generate coordinate data of absolute positions configured by X coordinate values and Y coordinate values of needle positions for a pattern to be sewn, the coordinate data generator comprising:
a coordinate data storage to store the coordinate data; and
a post-addition coordinate data generation section comprising a processor configured to:
respectively add independent values to the X coordinate values or the Y coordinate values of the coordinate data of the needle stored in the coordinate data storage, so as to generate new coordinate data, thereby increasing variation of distribution of the needle positions for the pattern.

2. The coordinate data generator of claim 1, wherein:
when items of coordinate data that are the same as each other are present in sewing data including a sewing sequence and coordinate data corresponding to the sewing sequence,
independent values respectively added to the X coordinate value and to the Y coordinate value of one item of the same coordinate data are set at the same values as the values respectively added to the X coordinate value and to the Y coordinate value of another item of the same coordinate data at another place in the sewing sequence.

3. The coordinate data generator of claim 1, wherein the independent values added to the X coordinate values or to the Y coordinate values of the coordinate data are different for each pattern of a plurality of the patterns.

4. The coordinate data generator of claim 1 further comprising:
a post-addition pattern display section to display a pattern of new coordinate data generated by the post-addition coordinate data generation section; and
a coordinate data processing section to save or edit the coordinate data for each pattern of a plurality of the pattern being displayed on the post-addition pattern display section.

5. The coordinate data generator of claim 1, wherein the independent values respectively added to the X coordinate values or the Y coordinate values of the coordinate data are random numbers lying within a prescribed range, the random numbers being generated or stored in the coordinate data generator.

6. The coordinate data generator of claim 1, wherein the independent values respectively added to the X coordinate values or the Y coordinate values of the coordinate data are positive values or negative values lying within a prescribed range.

7. The coordinate data generator of claim 1, wherein a spacing between the X coordinate value of the coordinate data generated by the post-addition coordinate data generation section and the X coordinate value of the coordinate data adjacent in the sewing sequence generated by the post-addition coordinate data generation section is a value lying within a restricted range of a sewing mechanism of the sewing machine.

8. A sewing machine comprising the coordinate data generator of claim 1.

9. A non-transitory recording medium recorded with a program to cause a computer to execute a coordinate data generation method that is performed in a sewing machine coordinate data generator including a coordinate data storage to store coordinate data and a post-addition coordinate data generation section, and that generates coordinate data of absolute positions configured by X coordinate values and Y coordinate values of needle positions for a pattern to be sewn, wherein:
the program recorded on the non-transitory recording medium causes the computer to execute processing in which the post-addition coordinate data generation section
respectively adds independent values to the X coordinate values or the Y coordinate values of the needle positions of coordinate data for each of a plurality of items of the coordinate data stored in the coordinate data storage, and
generates new coordinate data for the plurality of the items, thereby increasing variation of distribution of the needle positions for the pattern.

* * * * *